United States Patent Office 2,713,643
Patented July 19, 1955

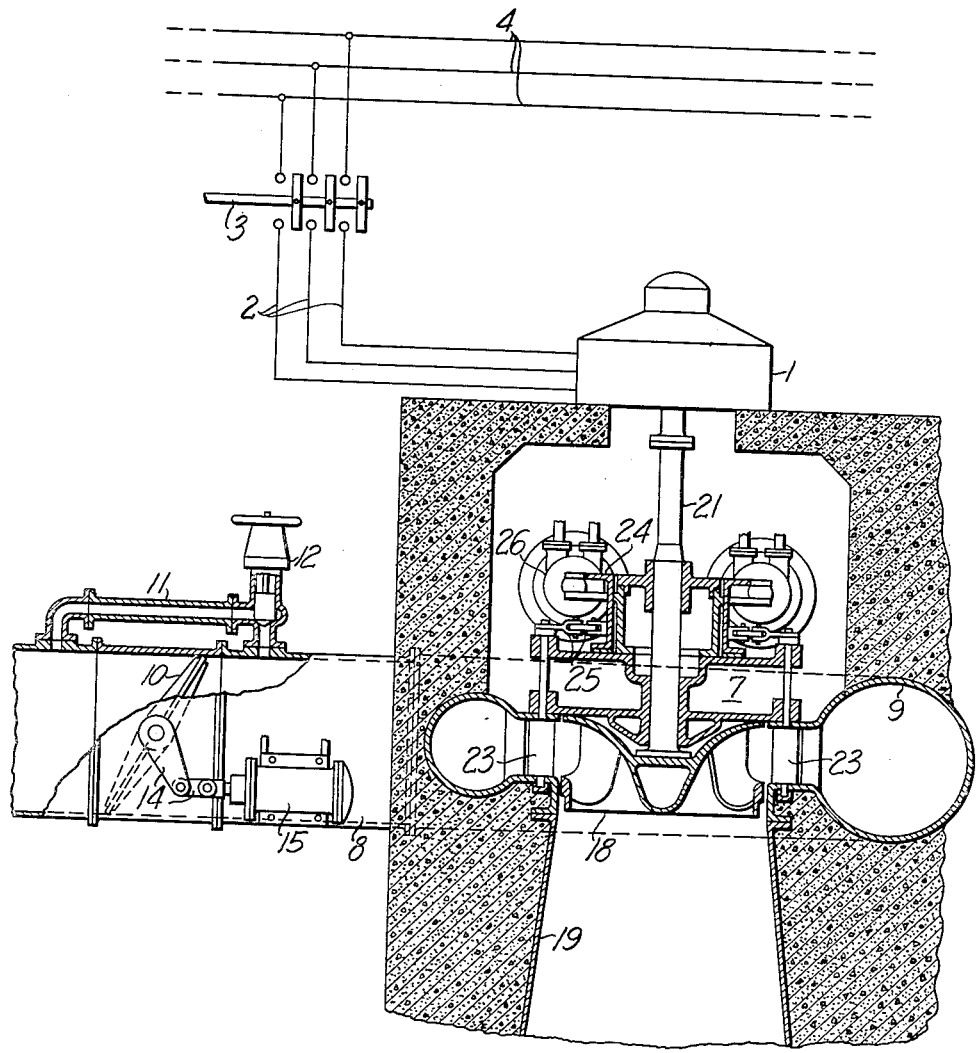

2,713,643

SPEED CONTROL OF HYDRAULIC TURBINE FOR AN ELECTRIC GENERATOR

William J. Rheingans, Wauwatosa, Wis., assignor to Allis-Chalmers Manufacturing Company, Milwaukee, Wis.

Application January 21, 1953, Serial No. 332,331

6 Claims. (Cl. 307—85)

This invention relates to a hydroelectric generating unit and is more particularly concerned with the starting and/or synchronizing of a hydraulic turbine driven synchronous generator unit.

A synchronous generator is defined as a synchronous alternating current machine in which the average speed of normal operation is exactly proportional to the frequency of the system to which it is connected. This speed is sometimes called the synchronous speed, because at this speed the synchronous generator will have a frequency corresponding to the frequency of the system. When the generator is disconnected from the system but running at synchronous speed it may be switched together with the system provided the terminal voltages of each are equal and in phase with each other. This switching together of the generator and system under the foregoing conditions is known as synchronizing.

For purposes of economy, the hydraulic turbine, which is coupled to the synchronous generator, is often built either without fluid-controlling wickets spaced about the impeller inlet, or with nonadjustable wickets fixed in predetermined open positions. With a turbine of this kind, and with a turbine of the kind having adjustable wickets fixed in predetermined open positions, it is a difficult problem (1) to start the turbine and (2) to synchronize the generator once the turbine is in motion.

Prior to this invention, no simple entirely satisfactory solution of these problems had been achieved. One solution was to substitute an induction generator for the synchronous generator. This substitution, however, is not attractive because the induction generator must be paralleled with an existing synchronous system to determine the generator's frequency and voltage and to obtain the necessary excitation. A synchronous generator, therefore, is the preferred electric power source, if some means can be found for starting the turbine and synchronizing the generator.

Accordingly, the present invention may be considered as being directed toward and having as an object the provision of a new and improved method of starting and/or synchronizing a hydraulic turbine driven synchronous generator unit comprising a turbine in which the wickets, if any, are maintained in a fixed position at least during starting and synchronizing.

Other objects and advantages will appear from the following description of the method applied to a hydroelectric synchronous generating unit, reference being had to the accompanying drawings, in which the single figure is a diagrammatic view, partly in section, of a hydroelectric power plant having a synchronous generator.

As shown in the drawing, the apparatus with which the method may be practiced comprises a synchronous generator 1, and means, shown as conductors 2 and a switch 3, for connecting the synchronous generator 1 to an electrical transmission system 4. A hydraulic turbine 7 is drivingly connected to the generator 1. A penstock 8 is connected to a spiral casing 9 of the turbine 7 for delivering motive fluid, from a source not shown, to the turbine 7. A main valve 10, such as a butterfly valve, for controlling the flow of motive fluid to turbine 7 is positioned in the penstock 8 between the turbine 7 and the source of motive fluid. Means for bypassing motive fluid in the penstock 8 around the main valve 10 comprises a bypass conduit 11 and a bypass valve 12 for controlling the flow of motive fluid through the bypass.

The main valve 10 is connected by a linkage 14 to a valve actuating servomotor 15 and is opened and closed by operation of the servomotor 15.

Motive fluid delivered to the spiral casing 9 from penstock 7 imparts rotary movement to a turbine impeller or runner 18. Motive fluid discharged by the runner 18 passes into a draft tube 19. The rotary motion of the runner 18 is transmitted by a main shaft 21 of the unit to the synchronous generator 1.

For purposes of illustration, the hydraulic turbine 7 of the hydroelectric unit of the drawing is of the type having adjustable wickets 23 which are interposed between the runner 18 and the spiral casing 9.

It is, of course, to be understood the hydraulic turbine of the hydroelectric unit may be of a type having (1) wickets permanently fixed in a predetermined opened position, or (2) no wickets.

In prior art methods the wickets 23 would usually be used for controlling the flow of motive fluid to the turbine runner 18. However, in the method of the invention, the wickets 23 are set in a predetermined open position so that for all intents and purposes they are the equivalent of fixed wickets or no wickets. The setting of the wickets 23 is not varied during starting or synchronizing of the generator 1. Accordingly, the method of the invention can be applied equally well to a turbine 7 without wickets or with stationary wickets.

In the turbine illustrated, the wickets 23 are positionable by a wicket operating ring 24 interconnected with the wickets 23 by linkages 25. The wicket operating ring 24 is actuated by servomotor 26.

The preferred apparatus with which the method may be practiced is shown in the drawing with the impeller at rest. The wickets 23 are shown set at a predetermined opening and it is not intended that this opening be varied during starting or synchronizing of the apparatus. The main valve 10 and the bypass valve 12 are closed. The switch 3 is open.

The turbine is started and the generator synchronized with the transmission system 4 by the following method: Main valve 10 is slowly opened admitting motive fluid to the turbine 7. The motive fluid imparts rotary motion to the runner 18 which is drivingly connected by the main shaft 21 to the synchronous generator 1. The main valve 10 is opened to a position at which sufficient motive fluid is admitted to the turbine 7 to maintain the speed of the generator 1 at a value approximately five percent to ten percent below predetermined synchronous sped. The main valve 10 then remains in this position and increased amounts of motive fluid are admitted to the turbine 7 through the bypass 11. The bypass valve 12, which controls the flow of fluid through the bypass 11, serves as a fine or vernier motive fluid control. By adjusting the bypass valve 12, sufficient additional motive fluid is admitted to the runner 18 of the turbine 7 to bring the generator 1 up to a speed at which the generator may be synchronized with the frequency of the system 4.

After the generator 1 has reached synchronous speed the generator 1 is placed on the transmission system 4 by closing the switch 3. The main valve 10 is then opened to full capacity as the bypass valve 12 is closed.

The generator 1 and turbine 7 may be returned to an at rest or nonoperating position by any of the conventional methods known to one skilled in the art. Moreover, a reversal of the steps of the foregoing method may be utilized to effect an at rest or nonoperating position of the generator 1 and turbine 7. But the method of stopping the generator 1 and the turbine 7 forms no part of the present invention.

It should be understood that it is not desired to limit the invention to the exact method of operation and the preferred apparatus shown herein, for various modifications within the scope of the claims, may occur to persons skilled in the art.

It is claimed and desired to secure by Letters Patent:

1. In a hydroelectric power plant comprising a synchronous generator, means for connecting said generator to an electrical transmission system having a predetermined frequency, a hydraulic turbine drivingly connected to said generator, a penstock connected to said turbine for delivering motive fluid to said turbine, a main valve in said penstock, means for bypassing penstock motive fluid around said main valve, and a valve in said bypass means; a method of starting and bringing said generator up to a speed corresponding to the frequency of the system which comprises the steps of adjusting said main valve to admit motive fluid to said turbine for starting and rotating said turbine at less than said speed, and then adjusting said bypass valve to admit additional motive fluid to said turbine to bring said turbine up to said speed.

2. In a hydroelectric power plant comprising a synchronous generator, means for connecting said generator to an electrical transmission system having a predetermined frequency, a hydraulic turbine drivingly connected to said generator, a penstock connected to said turbine for delivering motive fluid to said turbine, a main valve in said penstock, means for bypassing penstock motive fluid around said main valve; a method of starting and bringing said generator up to a speed corresponding to the frequency of the system which comprises the steps of adjusting said main valve to admit motive fluid to said turbine for starting and rotating said turbine at approximately ninety percent of said speed, and then adjusting said bypass valve to admit additional motive fluid to said turbine to bring said turbine up to said speed.

3. In a hydroelectric power plant comprising a synchronous generator, means for connecting said generator to an electrical transmission system having a predetermined frequency, a hydraulic turbine drivingly connected to said generator, a penstock connected to said turbine for delivering motive fluid to said turbine, a plurality of adjustable wickets interposed between said penstock and said turbine, a main valve in said penstock, and means for bypassing penstock motive fluid around said main valve, a method of starting the turbine from an at rest position in which the main valve and the bypass valve are closed, and the wickets are adjusted to a predetermined open position, and then connecting the generator to the electrical transmission system, the method comprising the steps of opening said main valve to admit motive fluid to said turbine to rotate said turbine from said rest position to a speed less than a speed corresponding to the frequency of said system, then opening said bypass valve to admit additional motive fluid to said turbine to bring said turbine up to said speed corresponding to the frequency of said system, and then closing said connecting means to connect said generator to said electrical transmission system.

4. In a hydroelectric power plant comprising a synchronous generator and means for connecting said generator to an electrical transmission system having a predetermined frequency, a hydraulic turbine drivingly connected to said generator, a penstock connected to said turbine for delivering motive fluid to said turbine, a plurality of wickets interposed between said penstock and said turbine spaced about said turbine and fixed in a predetermined open position, a main valve in said penstock, and means for bypassing penstock motive fluid around said main valve, a method of starting the turbine from an at rest position in which the main valve is closed and the bypass valve is closed and then connecting the generator to the electrical transmission system, the method comprising the steps of opening said main valve to admit motive fluid to said turbine to rotate said turbine from said rest position to a speed less than a speed corresponding to the frequency of said system, then opening said bypass valve to admit additional motive fluid to said turbine to bring said turbine up to said speed corresponding to the frequency of said system, and then closing said connecting means to connect said generator to said electrical transmission system.

5. In a hydroelectric power plant comprising a synchronous generator and means for connecting said generator to an electrical transmission system having a predetermined frequency, a hydraulic turbine drivingly connected to said generator, a penstock connected to said turbine for delivering motive fluid to said turbine, a main valve in said penstock, and means for bypassing penstock motive fluid around said main valve, a method of starting the turbine from an at rest position in which the main valve and the bypass valve is closed, the method comprising the steps of opening said main valve to admit motive fluid to said turbine to rotate said turbine from said rest position to a speed less than a speed corresponding to the frequency of said system, then opening said bypass valve to admit additional motive fluid to said turbine to bring said turbine up to said speed corresponding to the frequency of said system, and then closing said connecting means to connect said generator to said electrical transmission system.

6. In a hydroelectric power plant comprising a synchronous generator and means for connecting said generator to an electrical transmission system having a predetermined frequency, a hydraulic turbine drivingly connected to said generator, a penstock connected to said turbine for delivering motive fluid to said turbine, a plurality of adjustable wickets interposed between said penstock and said turbine, a main valve in said penstock, and means for bypassing penstock motive fluid around said main valve, a method of starting the turbine from an at rest position in which the main valve and the bypass valve is closed, and the wickets set in a predetermined open position, and then connecting the generator to the electrical transmission system, the method comprising the steps of opening said main valve to admit motive fluid to said turbine to rotate said turbine at a speed approximately ninety percent of a speed corresponding to the frequency of said system, then opening said bypass valve to admit additional motive fluid to said turbine to bring said turbine up to said speed corresponding to the frequency of said system, and then closing said connecting means to connect said generator to said electrical transmission when said speed corresponding to the frequency of said system is reached.

References Cited in the file of this patent

UNITED STATES PATENTS

| | | |
|---|---|---|
| Re. 19,966 | Stivender | May 12, 1936 |
| 727,601 | Dow | May 12, 1903 |
| 1,685,740 | Earle | Sept. 25, 1928 |
| 1,706,807 | Nye | Mar. 26, 1929 |
| 1,717,071 | Smith | June 11, 1929 |
| 1,761,797 | Pfau | June 3, 1930 |
| 1,859,839 | Nye | May 24, 1932 |

FOREIGN PATENTS

| | | |
|---|---|---|
| 95,667 | Germany | Jan. 8, 1898 |